United States Patent
Schmeisser et al.

(10) Patent No.: US 7,251,552 B2
(45) Date of Patent: Jul. 31, 2007

(54) DIAGNOSTIC DISPLAY UNIT INCLUDING REPLACEABLE DISPLAY PROTECTOR

(75) Inventors: Gordon F. Schmeisser, Santa Cruz, CA (US); Ed Cahill, Cullenagh (IE)

(73) Assignee: Snap-On Incorporated, Pleasant Prairie, WI (US)

( * ) Notice: Subject to any disclaimer, the term of this patent is extended or adjusted under 35 U.S.C. 154(b) by 158 days.

(21) Appl. No.: 11/113,213

(22) Filed: Apr. 22, 2005

(65) Prior Publication Data

US 2006/0241829 A1    Oct. 26, 2006

(51) Int. Cl.
    *G01M 17/00* (2006.01)
(52) U.S. Cl. ............... 701/29; 701/211; 340/438; 340/995.26
(58) Field of Classification Search .......... 701/29, 701/30, 31, 208, 211; 340/438, 439, 995.26; 455/575.1, 575.8
    See application file for complete search history.

(56) References Cited

U.S. PATENT DOCUMENTS

| 4,113,980 | A | * | 9/1978 | Bell ........................... 174/650 |
| 4,969,647 | A | * | 11/1990 | Mical et al. .................. 463/31 |
| 5,030,129 | A | * | 7/1991 | Koch ........................... 439/374 |
| 5,107,428 | A | * | 4/1992 | Bethencourt et al. ......... 701/35 |
| 5,224,868 | A |   | 7/1993 | Tseng |
| D345,164  | S | * | 3/1994 | Grae ........................... D14/401 |
| 5,404,267 | A | * | 4/1995 | Silva et al. .................. 361/683 |
| 5,515,303 | A | * | 5/1996 | Cargin et al. ................ 361/683 |
| 5,541,840 | A | * | 7/1996 | Gurne et al. .................. 701/33 |
| 5,561,331 | A | * | 10/1996 | Suyama et al. ............ 307/10.3 |
| 5,661,634 | A | * | 8/1997 | Obata et al. ................. 361/684 |
| 5,758,300 | A | * | 5/1998 | Abe ........................... 455/424 |
| 5,825,675 | A | * | 10/1998 | Want et al. .................. 708/142 |
| 5,835,342 | A | * | 11/1998 | Hunte ........................ 361/681 |
| 5,875,413 | A | * | 2/1999 | Vinci .......................... 702/91 |
| 5,884,202 | A | * | 3/1999 | Arjomand .................... 701/29 |
| 5,893,162 | A | * | 4/1999 | Lau et al. .................... 711/153 |
| 5,916,286 | A | * | 6/1999 | Seashore et al. ............. 701/29 |
| 5,993,743 | A | * | 11/1999 | Nordman et al. ............ 422/94 |
| 6,064,564 | A | * | 5/2000 | Song et al. .................. 361/680 |
| 6,144,976 | A | * | 11/2000 | Silva et al. .................. 708/100 |
| 6,153,843 | A | * | 11/2000 | Date et al. ................... 200/339 |
| 6,362,813 | B1 | * | 3/2002 | Worn et al. .................. 345/169 |
| 6,693,367 | B1 |  | 2/2004 | Schmeisser et al. |

FOREIGN PATENT DOCUMENTS

| EP | 0 672 981 A1 | 9/1995 |
| WO | WO 03/014896 A1 | 2/2003 |

* cited by examiner

*Primary Examiner*—Gertrude A. Jeanglaude
(74) *Attorney, Agent, or Firm*—McDermott Will & Emery LLP (57) ABSTRACT

A vehicle diagnostic display unit including a case, a display screen disposed within a front portion of the case, and a main support coupled to a side of the case for allowing a user to lift the vehicle diagnostic display unit with one hand. A navigation pad is disposed on a front surface of the main support, and the main support is configured to allow the user to simultaneously lift the diagnostic display unit and access the navigation pad with a thumb. The display unit also includes a user-replaceable, transparent protective cover that attaches to the front portion of the case over the display screen. The display unit and the protective cover include novel features that allow the protective cover to be replaced by a user without having to return the display unit to the manufacturer.

20 Claims, 9 Drawing Sheets

DIAGNOSTIC DISPLAY UNIT INCLUDING REPLACEABLE DISPLAY PROTECTOR

FIELD OF THE DISCLOSURE

The present disclosure generally relates to motor vehicle diagnostic equipment and methods and, more specifically, to a hand-held automotive diagnostic display unit including a replaceable display protector.

BACKGROUND OF THE DISCLOSURE

Modern vehicles include various electronic control units, such as microprocessors and controllers, that are programmed to control vehicle operations. Such control units include, for example, an Electronic Control Module (ECM) or on-board computer. The control units are designed to monitor the operation of vehicle electronics so as to optimize vehicle performance. For example, control units such as an ECM can monitor the amount of carbon monoxide in the engine exhaust and adjust the fuel/air ratio entering the cylinders in order to optimize combustion efficiency.

When multiple control units are available, they are typically interconnected so that certain key data is globally available. The data can be accessed by a user through an information port. Diagnostic systems are commonly used to obtain (and sometimes transmit) data through the information port. Accordingly, the diagnostic system can be used to monitor and adjust the operation of various systems of the vehicle, and also detect malfunctions.

Traditional diagnostic systems are provided in the form of units that are coupled to the information port by means of a data cable. The large diagnostic systems typically include a computer, a monitor, and a keyboard. Smaller, portable diagnostic systems are also now available. For example, U.S. Pat. No. 6,693,367, which is assigned to the assignee of the present application, shows a portable, hand-held vehicle diagnostic display unit that is configured such that a user can simultaneously lift and operate the diagnostic display unit with a single hand.

The portable, hand-held vehicle diagnostic display unit disclosed in U.S. Pat. No. 6,693,367 includes a display screen contained within a housing of the unit. The display screen is viewable through a window of a front panel of the housing and is protected by a layer of transparent plastic, such as a 0.1 inch layer of Lexan® resin polycarbonate. When the layer of transparent plastic becomes scratched or damaged such that the display screen is not viewable as desired, then the display unit is returned to the manufacturer for replacement of the layer of transparent plastic. During replacement, the manufacturer disassemblies the front panel of the housing, removes the used layer of transparent plastic, inserts a new layer of transparent plastic over the display screen, and reassemblies the front panel to the unit. Alternatively, the layer of transparent plastic may be provided as a part of the front panel, such that the entire front panel is replaced.

What is still desired is a new and improved automotive diagnostic display unit. Preferably, the automotive diagnostic display unit will be portable and configured such that a user can simultaneously lift and operate the diagnostic display unit with a single hand. The new and improved automotive diagnostic display unit will also preferably be provided with a user-replaceable, transparent protective cover for the display screen.

SUMMARY OF THE DISCLOSURE

The present disclosure provides a vehicle diagnostic display unit including a case, a display screen disposed within a front portion of the case, and a main support coupled to a side of the case for allowing a user to lift the vehicle diagnostic display unit with one hand. A navigation pad is disposed on a front surface of the main support, and the main support is configured to allow the user to simultaneously lift the diagnostic display unit and access the navigation pad with a thumb. The display unit also includes a user-replaceable, transparent protective cover that attaches to the front portion of the case over the display screen. The display unit and the protective cover include novel features that allow the protective cover to be replaced by a user without having to return the display unit to the manufacturer.

Additional aspects and advantages of the present disclosure will become readily apparent to those skilled in this art from the following detailed description, wherein only an exemplary embodiment of the present disclosure is shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF AN EXEMPLARY EMBODIMENT OF THE DISCLOSURE

Turning now the drawings, and initially to FIGS. 1 through 4, there is shown an exemplary embodiment of a vehicle diagnostic display unit 100 constructed in accordance with the present disclosure. The diagnostic display unit 100 is shown with an exemplary embodiment of a user-replaceable, transparent protective cover 10 that is constructed in accordance with the present disclosure. As its name implies, the transparent protective cover 10 protects a display screen 112 of the unit 100, yet can be replaced by a user (e.g., upon being scratched during use) such that the unit 100 does not have to be returned to the manufacturer for replacement. The transparent protective cover 10 is made of a suitably strong, transparent material, such as Lexan® resin polycarbonate.

Figure 1:
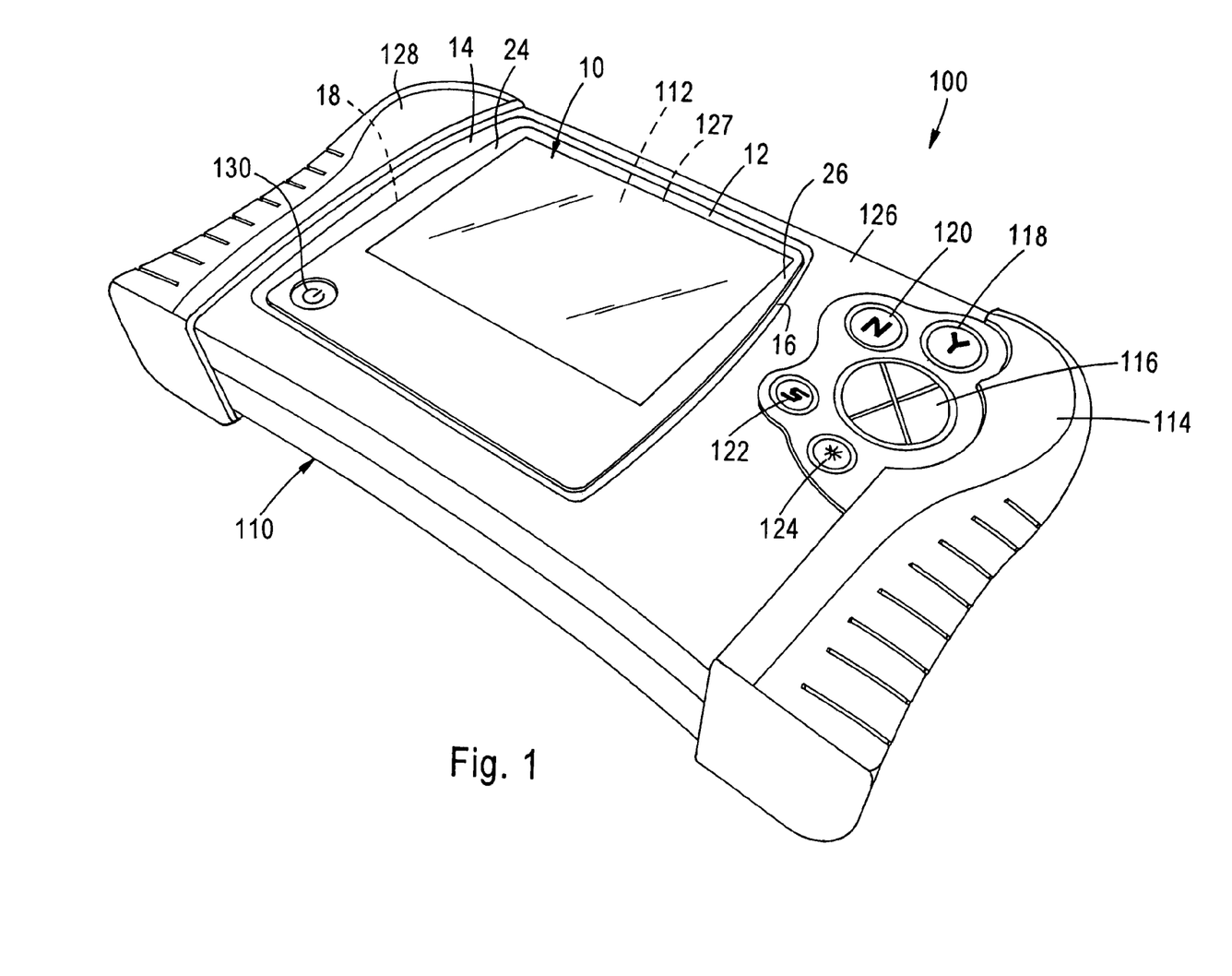
FIG. 1 is a front perspective view of an exemplary embodiment of a hand-held automotive diagnostic display unit according to the present disclosure.

Referring to FIG. 1, the exemplary embodiment of the diagnostic display unit 100 includes a case 110, the display screen 112, a main support 114, and a plurality of keys 116, 118, 120, 122, 124 disposed on the main support 114. The display screen 112 is mounted within a front portion 126 of the case 110 of the diagnostic display unit 100 and, in the exemplary embodiment shown, the display screen 112 is in the form of a liquid crystal display (LCD) screen. It should be noted, however, that various other types of display screens 112, such thin film transistor (TFT), touch sensitive, or gas plasma, can be used in place of the illustrated LCD display screen 112. A diagnostic display unit that is, in general, similar to the present diagnostic display unit 100 is described in U.S. Pat. No. 6,693,367, which is assigned to the assignee of the present application and incorporated herein by reference.

The main support 114 is coupled to a side of the case 110 to allow a user to hold and operate the diagnostic display unit 100 using one hand. According to one exemplary embodiment, the main support 114 is ergonomically designed based on the shape and contour of the hand. Specifically, the main support 114 is contoured to comfortably fit within the palm of the user when holding the diagnostic display unit 100. The display unit 100 may also be provided with a secondary support 128 on an opposite side of the case 110, as shown.

The selection keys 116, 118, 120, 122, 124 disposed on the front surface of the main support 114 are used to operate the diagnostic display unit 100. In the exemplary embodiment shown, the plurality of keys includes a navigation pad 116 and a plurality of selection keys 118, 120, 122, 124 associated with the navigation pad 116. The navigation pad 116 is in the form of a directional thumb pad. By applying pressure along different portions of the navigation pad with the thumb, the user can navigate a cursor, not shown, on the display screen 112 through various menus.

The selection keys 118, 120, 122, 124 allow an operator to make various selections within the menus displayed on the display screen 112. For example, the selection keys can comprise a "yes" key 118 and a "no" key 120. In operation, for example, the user would navigate the cursor to a particular item using the navigation pad 116, and press the "yes" key 118 to accept the entry or access an additional menu. The "no" key 120 can be used, for example, to reject a selection or navigate to a previous menu screen. The diagnostic display unit 100 also includes a power key 130 that allows the user to turn the diagnostic display unit 100 on and off.

A user can advantageously hold and operate the diagnostic display unit 100 using a single hand. This allows the user to utilize their free hand to access various items, or take notes, during the diagnostic process. Additionally, such a one-handed construction allows the user to quickly view and operate the diagnostic display unit 100 while, for example, working under the hood of the vehicle.

Although not shown, the diagnostic display unit 100 of the present disclosure may include at least one power supply compartment, e.g., battery compartment containing rechargeable batteries, to allow cordless operation. The display unit 100 may also include various connectors, such as a high density d-type connector for receiving a cable (not shown) that can be coupled to a vehicle's ECM or on-board computer. The diagnostic display unit 100 may further include a charging circuit that functions to supply a charge to the rechargeable batteries when the diagnostic display unit 100 is electrically coupled to the vehicle. Secondary connectors may be provided for exchanging data and various signals with external components or vehicle components other than the on-board computer and may include a RS-232 port, a universal serial bus (USB) port, an Ethernet port, and a power supply connection for connecting the diagnostic display unit 100 to an external power source. Although not shown, the diagnostic display unit 100 can also include at least one expansion slot provided within the case 110 for upgrading or improving various features of the diagnostic display unit 100. Such features can include, for example, volatile memory, non-volatile memory, a modem interface, etc. Such a feature advantageously allows the user to upgrade and improve the features of the diagnostic display unit 100, thereby extending its usable technological life. In other words, rather than replacing the diagnostic display unit 100 for a newer model, the expansion cards can be used to upgrade the features of an aging diagnostic display unit 100.

Referring to FIG. 1, the user-replaceable, transparent protective cover 10 protects the display screen 112 of the unit 100 during. This is especially important on a device, such as an automotive diagnostic tool, which may be used on a daily basis in a physically tough environment, such as an auto repair shop. The protective cover 10 is provided to protect the more expensive and delicate display screen 112. As such it is expected that the protective cover 10 may itself become scratched or otherwise damaged through normal use of the display unit 100, so that the transparency of the protective cover 10 is diminished. At such time, it will be desirable to replace the scratched and damaged protective cover with a new protective cover 10. The present disclosure provides a protective cover 10 that can be easily replaced by a user in the field, such that returning the display unit 100 to the manufacturer is not necessary for replacement of the cover 10.

Figure 4:
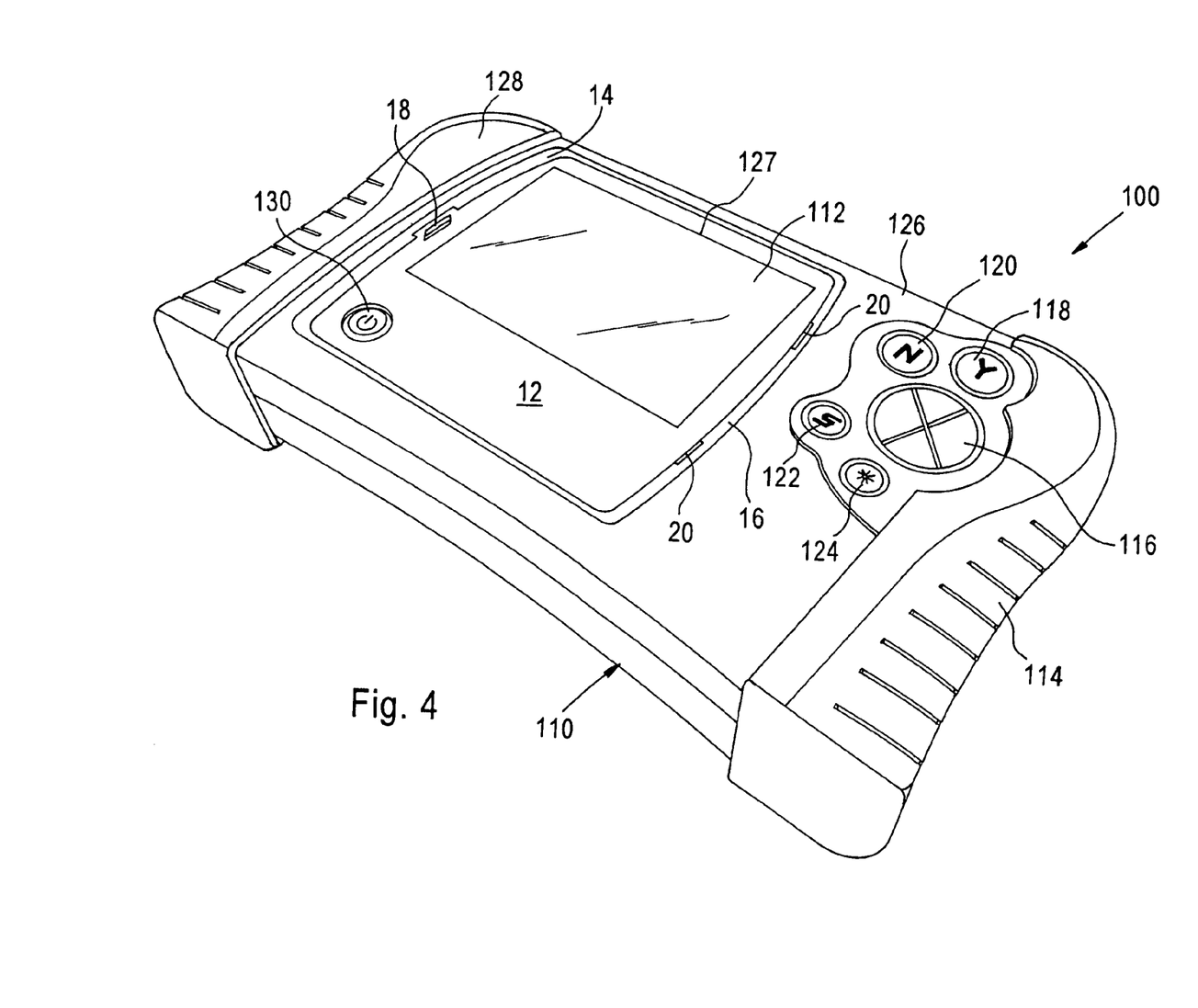
FIG. 4 is a front perspective view of the hand-held automotive diagnostic display unit of FIG. 1, wherein the user-replaceable, transparent protective cover is shown removed.

Referring to FIG. 4, an outer surface of the front portion 126 of the case 110 of the diagnostic display unit 100 includes an opening 127 for the display screen 112 and a recess 12 surrounding the opening 127. The recess 12 and the protective cover 10 are both sized and adapted such that the protective cover 10 is received within the recess 12 over the display screen 112 and is flush with the outer surface of the front portion 126 of the case 110, as shown best in FIG. 1.

Figure 2:
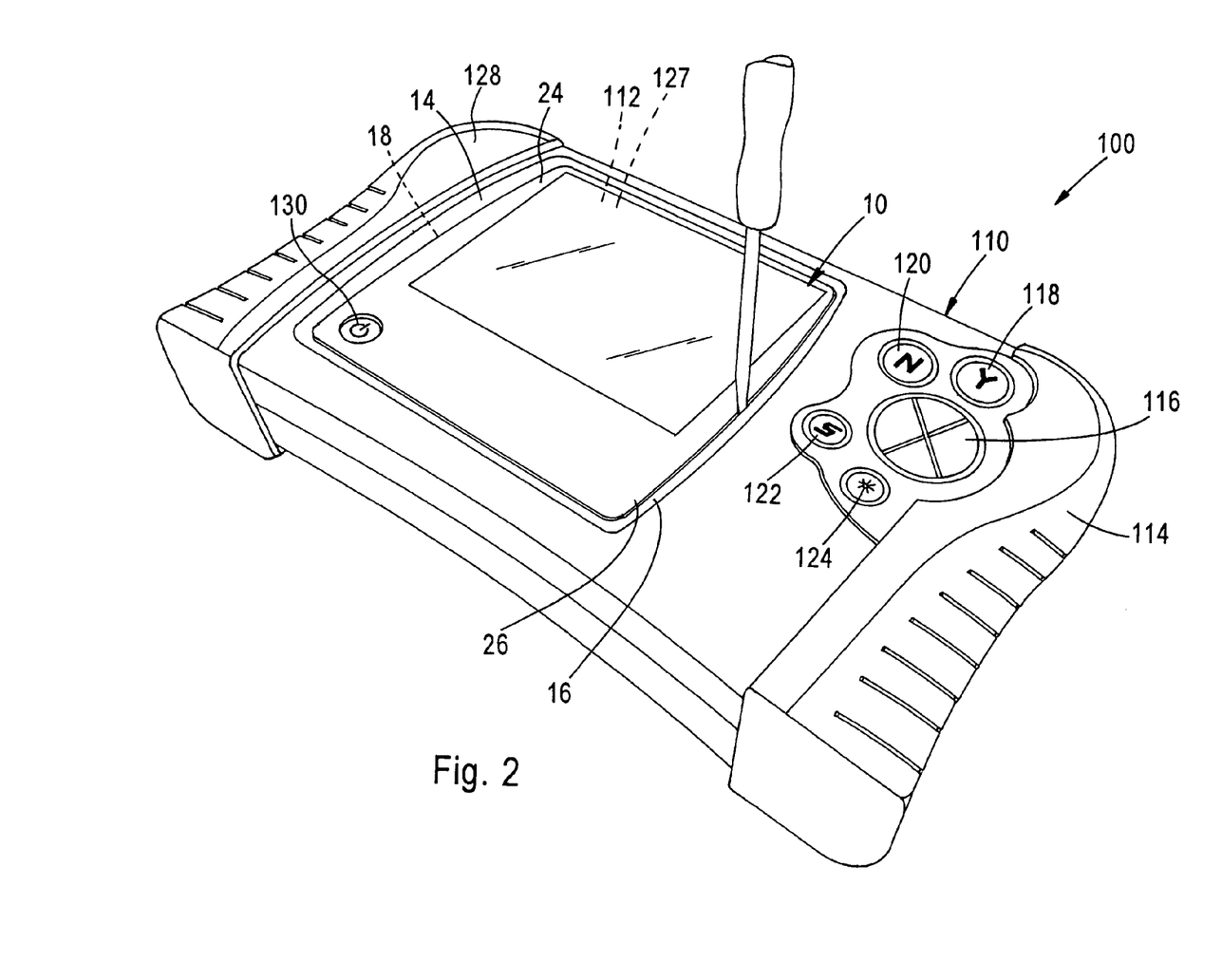
FIGS. 2 and 3 are front perspective views of the hand-held automotive diagnostic display unit of FIG. 1, wherein an exemplary embodiment of a user-replaceable, transparent protective cover is shown being removed using a flat head screwdriver.
Figure 3:
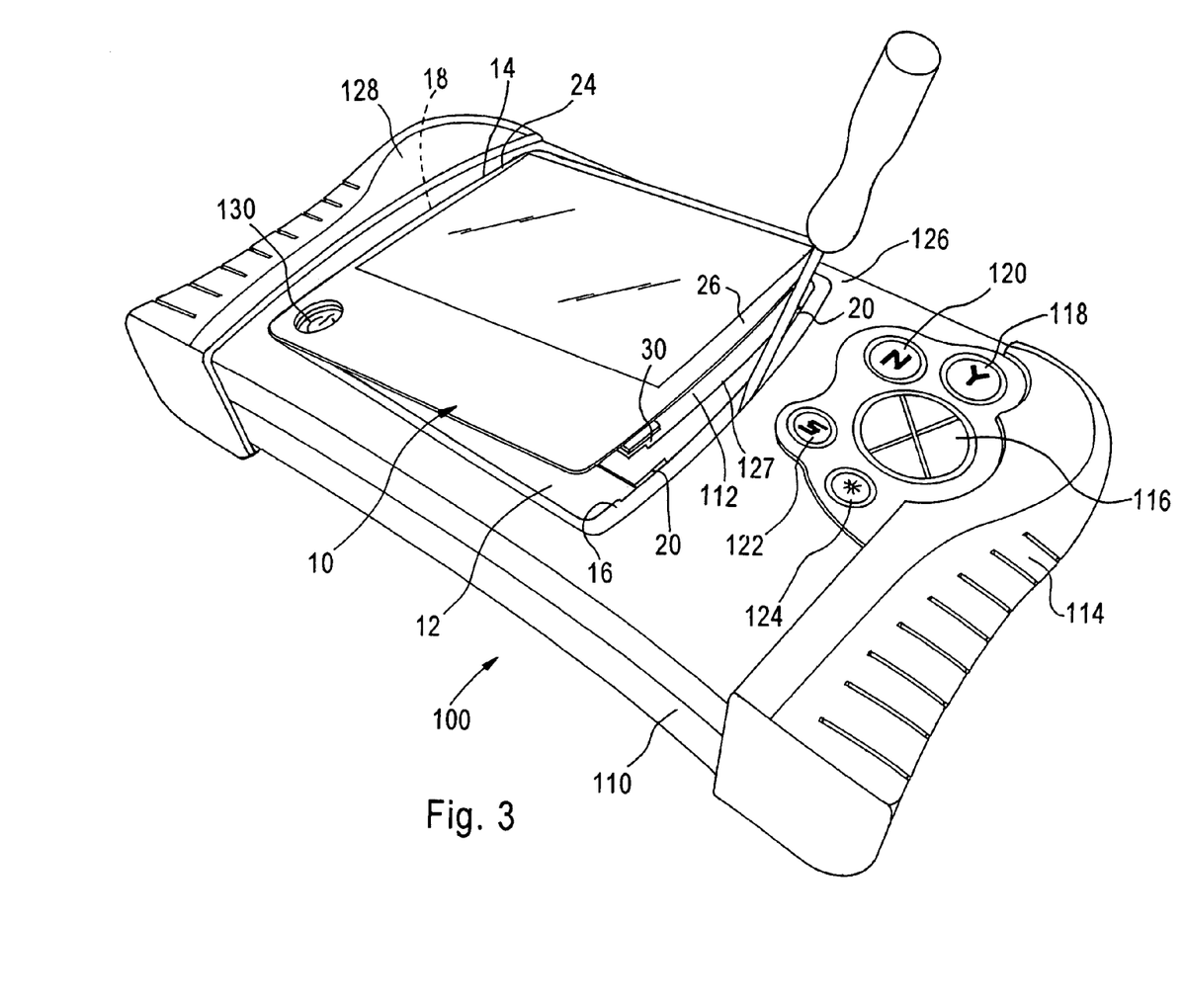
Figure 5:
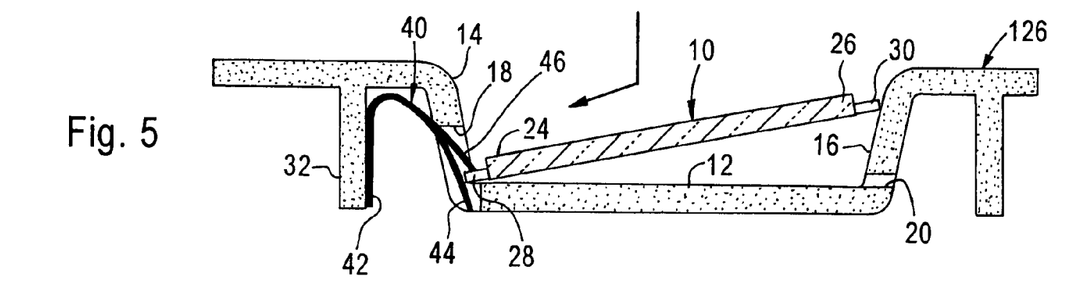
FIGS. 5 through 7 are sectional views of a front panel of the hand-held automotive diagnostic display unit of FIG. 1, wherein the user-replaceable, transparent protective cover is shown being reattached to the display unit, and wherein an exemplary embodiment of a spring according to the present disclosure biases the cover such that the cover is secured to the display unit.
Figure 6:
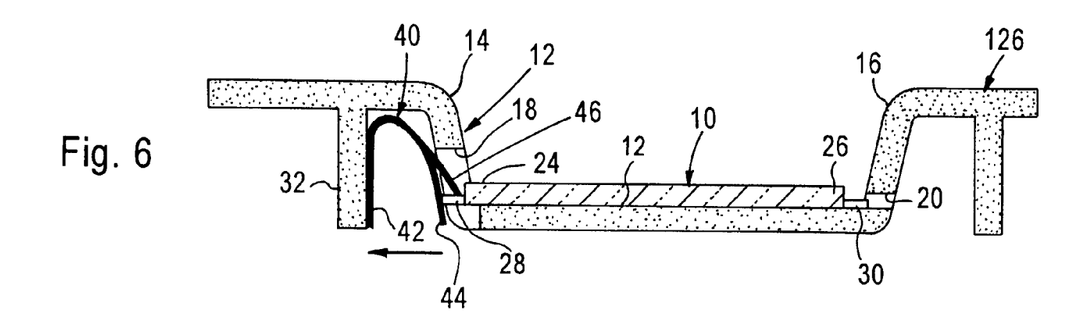
Figure 7:
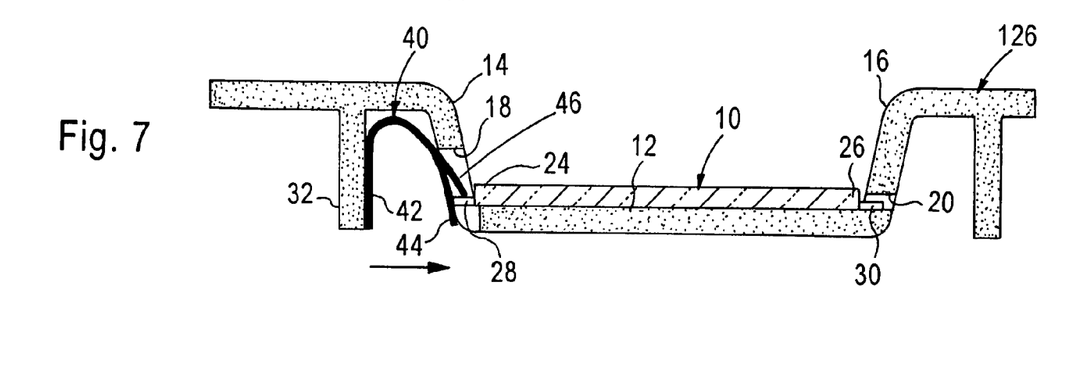

In the exemplary embodiment shown, both the protective cover 10 and the recess 12 are provided with matching rectangular shapes. As shown best in FIG. 4, opposing side walls 14, 16 of the recess 12 each include, respectively, at least one slot 18, 20. In the exemplary embodiment shown, a first 14 of the opposing side walls includes one centrally located slot 18 while a second 16 of the opposing side walls include two spaced-apart slots 20. In FIGS. 2 and 3 the protective cover 10 is shown being removed using a flat head screwdriver, while in FIGS. 5 through 7 the user-replaceable, transparent protective cover 10 is shown being reattached to the display unit 100. (FIGS. 5 through 7 are not to actual scale or proportion but are simply provided to illustrate replacement of the protective cover 10.) As shown best in FIG. 3 and FIGS. 5 through 7, the protective cover 10 includes opposing ends 24, 26 with tabs 28, 30 extending respectively there from. The tabs 28, 30 of the cover 10 correspond to the slots 18, 20 of the recess 12 such that a first 24 of the opposing ends of the cover 10 has one centrally located tab 28, while a second 26 of the opposing ends of the cover 10 has two spaced-apart tabs 30.

Referring to FIGS. 5 through 7, a spring 40 is provided in the slot 18 of the first end wall 14 of the recess 12 and is adapted to bias the cover 10 towards the opposing second end wall 16 of the recess 12 in order to secure the tabs 30 in the slots 20 and hold the cover 10 in the recess 12. In the exemplary embodiment shown, the spring 40 is generally U-shaped and has two spaced-apart legs 42, 44. A first of the legs 42 is positioned against an internal wall 32 of the case 110 while a second of the legs 44 is biased against the slot 18. As shown in FIGS. 5 through 7, the second leg 44 of the spring 40 contact the tab 38 of the cover 10 when the cover is received in the recess 12. In the exemplary embodiment shown, the spring 40 also includes a clip 46 extending from the second leg 44 that is adapted to catch on a top surface of the tab 38 of the cover 10 and hold the tab against the bottom of the recess 12.

Thus normally the spring 40 biases the cover 10 towards the second side wall 16 of the recess 12 and also biases the tabs 30 of the cover 10 into the slots 20 of the second side wall 16 such that the cover is secured in the recess. To remove the cover 10, the cover is moved against the force of the spring 40 until the tabs 30 are fully removed from the slots 20. Then the second end 26 of the cover 10 is lifted out of the recess 12. The cover 10 can be removed in such a manner by using a common tool, such as a flat-head screw driver as illustrated in FIGS. 2 and 3.

To reattach the same cover or a replacement cover 10, the first end of the cover is placed into the recess 12 and the tab 28 is inserted into the slot 18, as shown in FIG. 5. Then the cover 10 is moved against the force of the spring 40 and the second side 26 of the cover 10 is dropped into the recess 12 so that the opposite the tabs 30 are aligned with the slots 20, as shown in FIG. 6. Then the cover 10 is released such that the spring 40 is allowed to bias the tabs 30 of the cover 10 into the slots 20 of the second side wall 16 of the recess 12 such that the cover is secured in the recess, as shown in FIG. 7.

Referring now to FIGS. 8 through 11, another exemplary embodiment of a spring 140 according to the present disclosure for use as part of the diagnostic display unit 100 of FIG. 1 is shown. The spring 140, which acts to bias the protective cover 10 such that the cover is secured to the display unit 100, is similar to the spring 40 of FIGS. 5 through 7 and acts in a similar fashion to secure the protective cover 10 to the display unit 100. The spring 140 is different from the spring 40 of FIGS. 5 through 7 in that the spring 140 of FIGS. 8 through 11 is "shorter" and, therefore, nests closer to the inside of the top portion 126 of the case 110 of the display unit 100 and allows a thinner, more compact design of the case 110.

Figure 8:
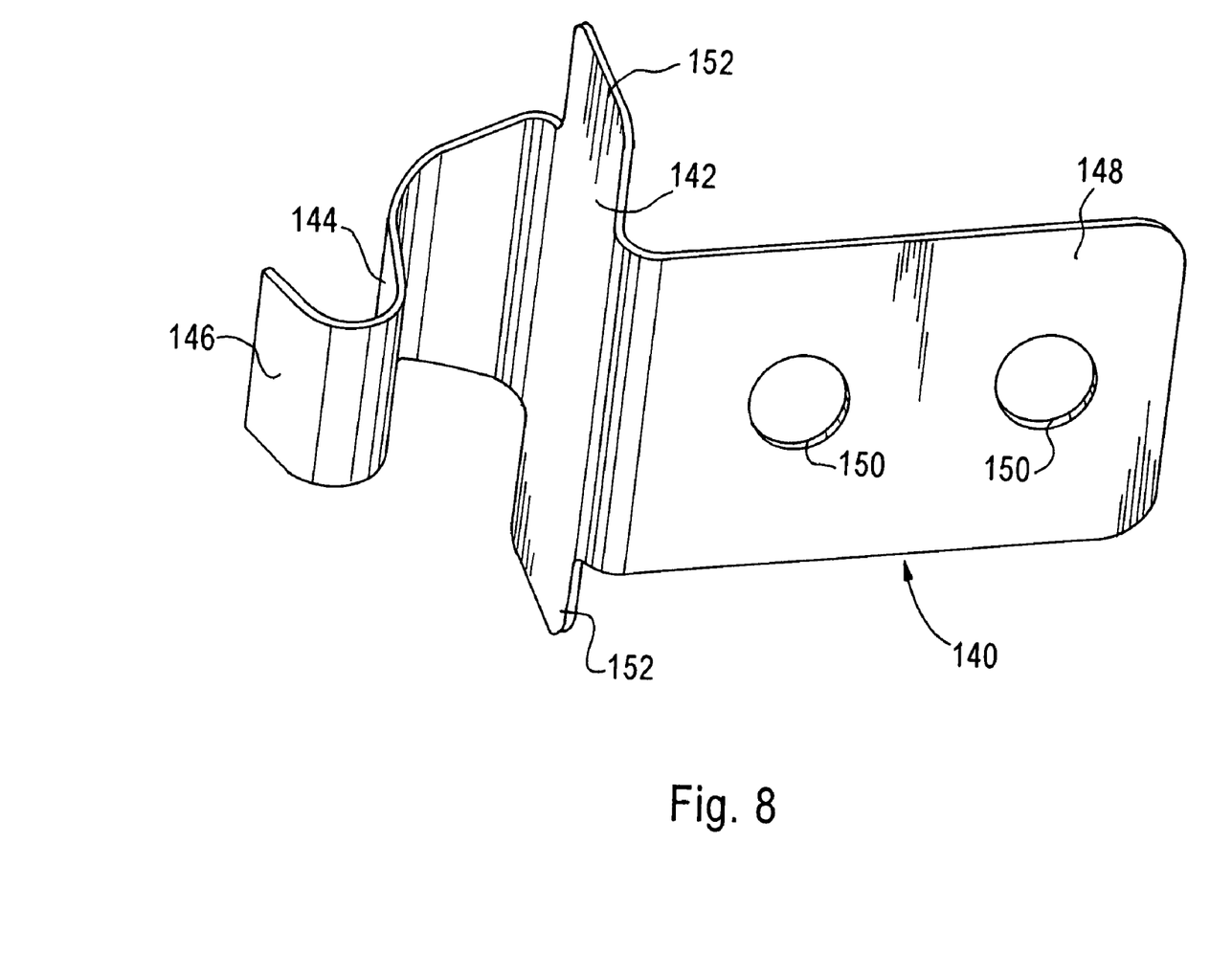
FIG. 8 is a top perspective view of another exemplary embodiment of a spring according to the present disclosure for use as part of the diagnostic display unit of FIG. 1 and which acts to bias the protective cover such that the cover is secured to the display unit.
Figure 9:
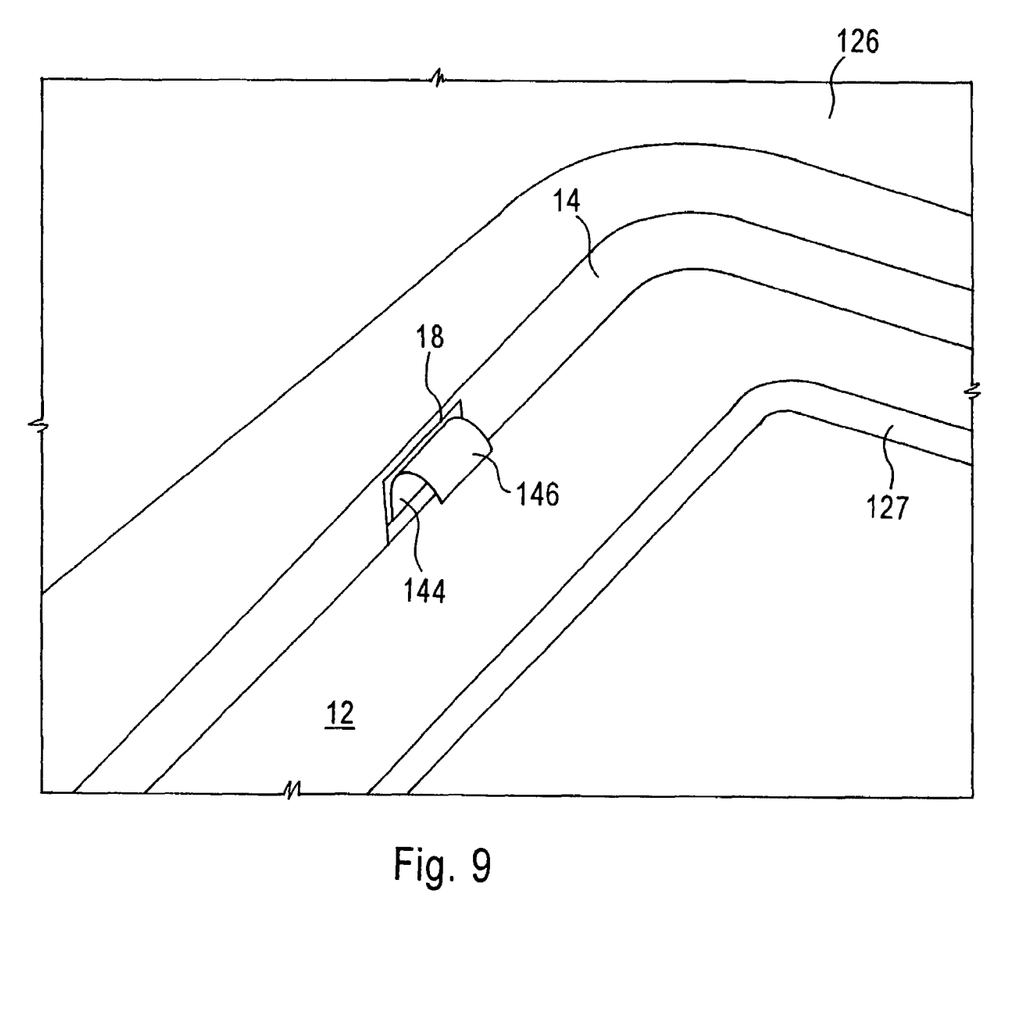
FIG. 9 is a perspective view of a front face of a front portion of a case of the hand-held automotive diagnostic display unit of FIG. 1, wherein an end of the spring of FIG. 8 is shown extending out of a slot of the case.
Figure 10:
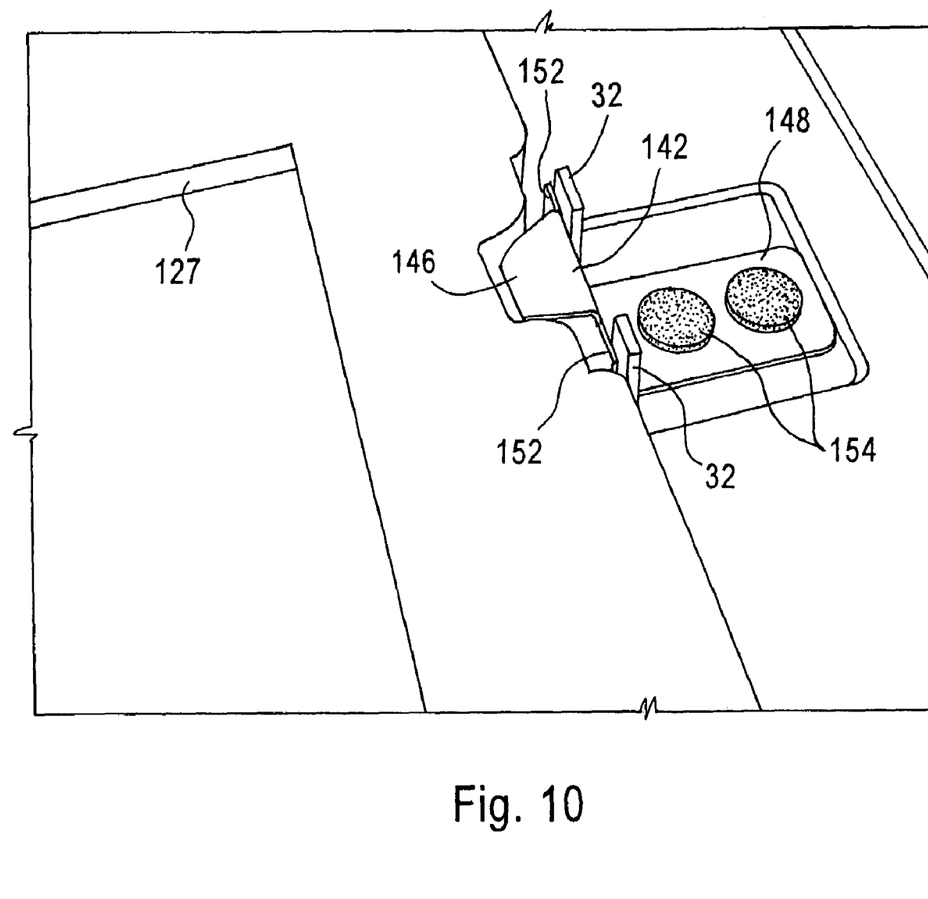
FIGS. 10 and 11 are perspective views of a rear face of the front portion of the case of the hand-held automotive diagnostic display unit of FIG. 1, wherein the spring of FIG. 8 is shown secured to the case adjacent the slot.
Figure 11:
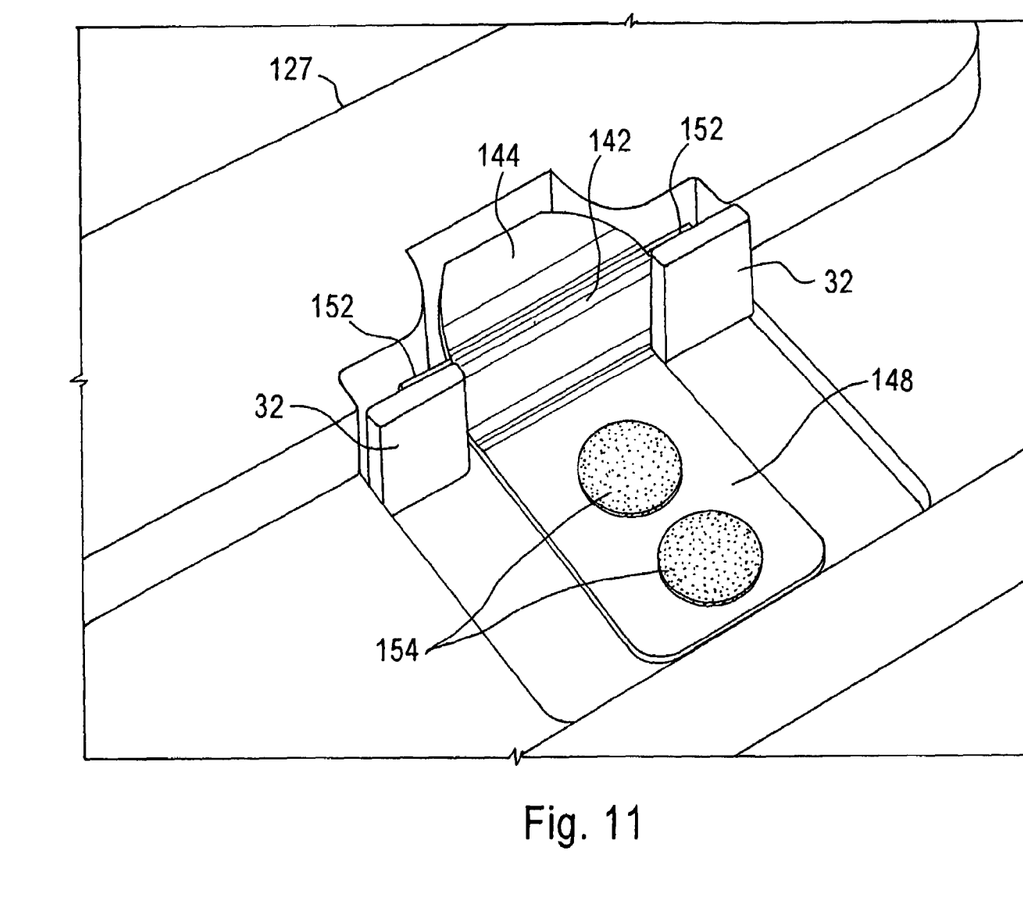

In the exemplary embodiment shown, the spring 140 is generally U-shaped and has two spaced-apart legs 142, 144, as shown best in FIG. 8. A first of the legs 142 is provided with side extensions 152 that are positioned against internal walls 32 of the case 110, as shown in FIGS. 10 and 11, while a second of the legs 144 is biased against the slot 18. The second leg 144 of the spring 140 is for contacting the tab 38 of the cover 10 when the cover is received in the recess 12 of the case 110. In the exemplary embodiment shown, the spring 140 also includes a clip 146 extending from the second leg 144 that is adapted to catch on a top surface of the tab 38 of the cover 10 and hold the tab against the bottom of the recess 12. The spring 140 is provided in the slot 18 of the first end wall 14 of the recess 12, as shown in FIGS. 9 through 11, and is adapted to bias the cover 10 towards the opposing second end wall 16 of the recess 12 in order to secure the tabs 30 in the slots 20 and hold the cover 10 in the recess 12.

As shown in FIG. 8, the spring 140 also includes a plate 148 extending perpendicular from the first leg 142 and including holes 150. As shown in FIGS. 10 and 11, fasteners 154 extend through the holes (not viewable in FIGS. 10 and 11) of the plate 148 and secure the spring 140 to the inside of the top portion 126 of the case 110 of the display unit 100. In the exemplary embodiment shown, the fasteners comprise ultrasonically melted studs 154 that are unitarily formed with the top portion 126 of the case 110.

The present disclosure, therefore, provides an automotive diagnostic display unit 100 including a user-replaceable, transparent protective cover 10. The specific devices described in this specification have been presented by way of illustration rather than limitation, and various modifications, combinations and substitutions may be effected by those skilled in the art without departure either in spirit or scope from this disclosure in its broader aspects and as set forth in the appended claims. The devices disclosed herein, and all elements thereof, are contained within the scope of at least one of the following claims. No elements of the presently disclosed devices are meant to be disclaimed.

What is claimed is:

1. A vehicle diagnostic display unit comprising:
   a case including,
      an outer surface having an opening, and
      a recess in the outer surface surrounding the opening, wherein the recess includes opposing side walls, and wherein each of the opposing side walls includes at least one slot;
   a display screen disposed within the case and viewable through the opening of the case;
   a main support coupled to the case to allow the user to lift the vehicle diagnostic display unit using one hand;
   a navigation pad disposed on the main support, wherein the main support is configured to allow a user to simultaneously lift the diagnostic display unit and access the navigation pad with a thumb;
   a protective cover received in the recess over the opening of the case, wherein opposing ends of the cover include tabs that are received in the slots of the recess to secure the cover in the recess; and
   a spring biasing the cover against one of the opposing side walls of the recess.

2. A vehicle diagnostic display unit according to claim 1, wherein the protective cover is transparent.

3. A vehicle diagnostic display unit according to claim 1, wherein the protective cover is flush with the outer surface of the case.

4. A vehicle diagnostic display unit according to claim 1, wherein the protective cover and the recess have matching rectangular shapes.

5. A vehicle diagnostic display unit according to claim 1, wherein a first of the opposing side walls includes one of the slots and a second of the opposing side walls includes two of the slots.

6. A vehicle diagnostic display unit according to claim 1, wherein the spring is provided within the case.

7. A vehicle diagnostic display unit according to claim 1, wherein the spring is generally U-shaped and has two spaced-apart legs, wherein a first of the legs is positioned against an internal wall of the case while a second of the legs is biased against the slot and contacts the tab of the cover when the cover is received in the recess.

8. A vehicle diagnostic display unit according to claim 7, wherein the spring also includes a clip extending from the second leg that is adapted to catch on a top surface of the tab of the cover and hold the tab against a bottom of the recess when the cover is received in the recess.

9. A vehicle diagnostic display unit according to claim 1, wherein the spring also includes a clip adapted to catch on a top surface of the tab of the cover and hold the tab against a bottom of the recess when the cover is received in the recess.

10. A vehicle diagnostic display unit according to claim 1, further comprising a clip adapted to catch on a top surface of the tab of the cover and hold the tab against a bottom of the recess when the cover is received in the recess.

11. A display unit comprising:
a case including,
an opening, and
walls positioned on opposing sides of the opening, and wherein each of the opposing walls includes at least one slot;
a display screen disposed within the opening of the case;
a protective cover received over the opening of the case and between the opposing walls, wherein opposing ends of the cover include tabs that are received in the slots of the walls to secure the cover over the display screen; and
a spring biasing the cover against one of the opposing walls.

12. A display unit according to claim 11, wherein the protective cover is transparent.

13. A display unit according to claim 11, wherein the protective cover is flat.

14. A display unit according to claim 11, wherein the protective cover is rectangular.

15. A display unit according to claim 11, wherein a first of the opposing walls includes one of the slots and a second of the opposing walls includes two of the slots.

16. A display unit according to claim 11, wherein the spring is provided within the case.

17. A display unit according to claim 11, wherein the spring is generally U-shaped and has two spaced-apart legs, wherein a first of the legs is positioned against an internal wall of the case while a second of the legs is biased against the slot and contacts the tab of the cover when the cover is received over the display screen.

18. A display unit according to claim 17, wherein the spring also includes a clip extending from the second leg that is adapted to catch on a top surface of the tab of the cover and hold the tab against the case when the cover is received over the display screen.

19. A display unit according to claim 11, wherein the spring also includes a clip adapted to catch on a top surface of the tab of the cover and hold the tab against the case when the cover is received over the display screen.

20. A display unit according to claim 11, further comprising a clip adapted to hold the tab of the cover against the case when the cover is received over the display screen.

* * * * *